United States Patent [19]

Bevan et al.

[11] 4,325,429

[45] Apr. 20, 1982

[54] UNITARY BATTERY FORMATION TUB

[75] Inventors: William G. Bevan, Birdsboro, Pa.; Larry L. Sterling, Frankfort, Ind.

[73] Assignee: General Battery Corporation, Reading, Pa.

[21] Appl. No.: 153,407

[22] Filed: May 27, 1980

[51] Int. Cl.³ .......................... F28F 25/02; F28F 9/26
[52] U.S. Cl. .................. 165/80 E; 165/116; 165/137
[58] Field of Search ................... 165/80 E, 116, 137

[56] References Cited

U.S. PATENT DOCUMENTS

| 99,502 | 2/1870 | Tattle | 165/116 |
|---|---|---|---|
| 170,618 | 11/1875 | Bort | 165/80 E |
| 177,640 | 5/1876 | Hofstatter | 165/80 E |
| 647,388 | 4/1900 | Evans | 165/80 E |
| 649,491 | 5/1900 | Sperry | 49/120 |
| 729,121 | 5/1903 | Boby | 165/116 |
| 1,472,454 | 10/1923 | Benedict | 165/80 E |
| 1,609,672 | 12/1926 | Stickle | 165/116 |
| 2,038,002 | 4/1936 | Ris | 165/116 |
| 2,364,144 | 12/1944 | Hunsaker | 429/120 |
| 2,400,675 | 5/1946 | Wyllie, Jr. | 165/80 E |
| 2,528,266 | 10/1950 | Daily et al. | 204/192 |
| 2,600,696 | 6/1952 | Schmidt | 19/105 |
| 3,221,394 | 12/1965 | Pitts | 29/588 |
| 3,868,123 | 2/1975 | Berg et al. | 211/194 X |
| 4,053,280 | 10/1977 | Salisbury | 134/135 X |
| 4,092,055 | 5/1978 | Wallenwaber | 312/49 |
| 4,117,387 | 9/1978 | Windisch et al. | 429/120 |

FOREIGN PATENT DOCUMENTS

| 11515 | 2/1934 | Australia | 206/333 |
|---|---|---|---|
| 2061781 | 6/1972 | Fed. Rep. of Germany . | |

Primary Examiner—Sheldon J. Richter
Attorney, Agent, or Firm—Benasutti Associates, Ltd.

[57] ABSTRACT

An apparatus for forming a plurality of batteries, comprising a fluid containing body having a base and opposing side walls, a series of supports positioned at the corners of the body defined by intersecting side walls, a fluid inlet manifold connected to a first side wall and communicating with the body, and a fluid outlet manifold connected to a second side wall horizontally opposing the first side wall and communicating with the body, wherein the body, the legs, the fluid inlet and the fluid outlet comprise a unitary structure. The apparatus is particularly adapted for stacking in a vertical array, providing a cascading fluid arrangement, by positioning the fluid outlet of a first, upper apparatus in vertical spaced relation to the inlet of a second, lower apparatus.

19 Claims, 8 Drawing Figures

UNITARY BATTERY FORMATION TUB

BACKGROUND OF THE INVENTION

This invention relates generally to the production of batteries during the neutralization, forming and charging stages, and more particularly, to a formation tub utilized in this process.

One problem often encountered in the battery industry relates to the control of temperature and time of battery formation. When electrolyte is first added to a previously unfilled, unformed battery it interacts with the paste on the plates contained within the battery, and a great deal of heat is generated. This heat is referred to as the heat of neutralization. Heat continues to be generated by the battery during the formation and charging process, particularly while a high current flow is present through the batteries. While it is possible to control the heat generated by using lower current rates, it is uneconomical to purchase and maintain sufficient equipment to form batteries at a current low enough to prevent this heating of the batteries.

Because of the heat generated during formation, a great deal of acid passes from the batteries into the surrounding atmosphere, creating an uncomfortable and corrosive environment. This is particularly true where, for economic reasons, a large number of batteries are being formed simultaneously in a minimum amount of forming room floor space. In addition, internal overheating of the batteries, if not properly controlled, can result in the damage or destruction of the battery.

Various means have been devised to cool batteries during the neutralization, formation, and charging process in order to avoid internal overheating of the batteries. The problem of dissipating heat which is generated during the formation of a battery has been aggravated by the widespread use of plastic battery cases throughout the automotive battery industry. Unlike rubber, composition, or glass cases previously used by the industry, plastic cases tend to have a low heat transfer coefficient which tends to insulate the interior of the battery, making it particularly susceptible to overheating problems.

Several approaches, such as circulating water baths in which batteries stand in rows of tanks permanently erected on the floor of the forming room, have been used in attempts to dissipate the heat produced when using high current during the battery neutralization, formation and charging process. While this has been successful, it is a highly restrictive technique and does not allow individual rectifying circuit control for batteries at various stages of neutralization, formation and charging.

Due to the relatively higher volumes of batteries produced, the use of plastic case designs and the various grid alloys and oxide mixtures now commonly used in the production of batteries, such prior art techniques have not proved satisfactory, and relatively long formation times have, therefore, been necessitated to insure that overheating does not occur during formation.

U.S. patent application Ser. No. 866,301, filed Jan. 3, 1978, now abandoned discloses an apparatus which is useful in overcoming the above described problems. In its preferred embodiment, the apparatus comprises a container means for holding a plurality of batteries in a pool of cooling fluid, such as water, which partially surrounds the batteries. The batteries are electrically connected in series within the tub and are adapted to be connected to a single charging circuit for each tub of batteries. The apparatus further comprises a transport means for facilitating transportation of the container means with the batteries therein, and for adapting the container means for stacking in a vertical array.

In the preferred embodiment, the tub is made of molded plastic and comprises a flange along each side of the tub. At least a portion of the flange acts as a lip means for engaging the transport means. The transport means is a metal frame having a plurality of vertical posts at each of the corners of the frame, the posts being connected by side members which receive the lip means or flange of the tub for aligning the tub within the frame. The frame also comprises a plurality of parallel, spaced transverse members located in a plane below the bottom of the tub for supporting the tub, and adapted to be engaged by a transportation mechanism such as a forklift truck for lifting the frame (with the tub and batteries) to stack it in a vertical array, or to move it to another part of the forming room floor.

In order to facilitate the stacking of the frames, one on top of the other, each post includes a tapered portion at one end which is adapted to engage hollow portions located at the other ends of the posts of a second frame which is to be placed above the first frame.

Each tub is filled with water when the forming process begins. This can be accomplished by filling the first tub with cooling fluid to a certain predetermined level, at which point the fluid is then allowed to overflow through an overflow opening or hole in the side of the tub, and from there, into the next lower adjacent tub. This process is repeated until the last tub is filled. At this point, the water overflows onto the forming room floor and is carried off to a cooling tower as described in U.S. Pat. No. 4,117,387. Alternatively, each of the tubs could be filled independently, or overflow could take place between two or more tubs with the overall array being filled at a number of places in the array. A variety of tub filling techniques may be used if desired.

Such an apparatus serves well in the formation of a maximum number of batteries in the minimum amount of forming room floor space. In addition, this apparatus greatly reduces the hazards attributable to the corrosive acid atmosphere which generally accompanies the formation of a large number of batteries in a single forming room. As the acid entrained atmosphere rises from the battery filled tubs, it impinges the bottom of the next higher tub whereupon it condenses and drips back into the lowermost tub. In this way, a large amount of the gases rising from the batteries being formed are captured by the apparatus and returned to the tubs. The cooling fluid, which comprises mainly water in the preferred embodiment, can be neutralized on its way back to the cooling tower. This apparatus, then, in addition to providing an economical way of forming a maximum number of batteries in a minimum amount of floor space, also serves to minimize adverse environmental impacts as a result of the formation process.

Although well adapted to its purpose, such an apparatus is still capable of further improvement. For example, the apparatus described is assembled from a combination of discrete components, each of which is constructed from one or more different materials. As a result, use of the apparatus requires prior assembly of its components. Moreover, such components must be properly aligned to assure proper operation. Each of these factors introduces a possibility for error in the system, as well as contributing to increased costs.

It, therefore, becomes desirable to develop a formation tub which eliminates one or more of these potential drawbacks.

SUMMARY OF THE INVENTION

In accordance with the present invention, there is provided a unitary tub and frame assembly generally comprising a tub body having at each corner an integral support member, and at least one inlet and one outlet, or drain, located along opposing sides of the tub. All the elements are formed as part of the tub assembly during its manufacture, and are dimensionally configured so that the elements of any given tub will align with those of another tub to be stacked with the first tub. An interchangeable, stackable tub and frame assembly is therefore provided.

It is therefore an object of the present invention to provide a tub and frame assembly, adapted for use during the neutralization, formation and charging stages of production of storage batteries, which is capable of containing a maximum number of batteries in a minimum amount of floor space.

It is also an object of the present invention to provide a tub and frame assembly which is interchangeable and which is capable of being stacked in a vertical array during use, yet which is easily stored away when not in use.

It is also an object of the present invention to provide a tub and frame assembly which is easily assembled for use, requiring a minimum amount of assembly and adjustment prior to use.

These and other objects will become apparent from the following detailed description of a preferred embodiment of the invention, taken in view of the following drawings.

BRIEF DESCRIPTION OF THE DRAWINGS

In each of the several views provided, like reference numerals denote similar structure.

DESCRIPTION OF THE PREFERRED EMBODIMENT

Figure 1:
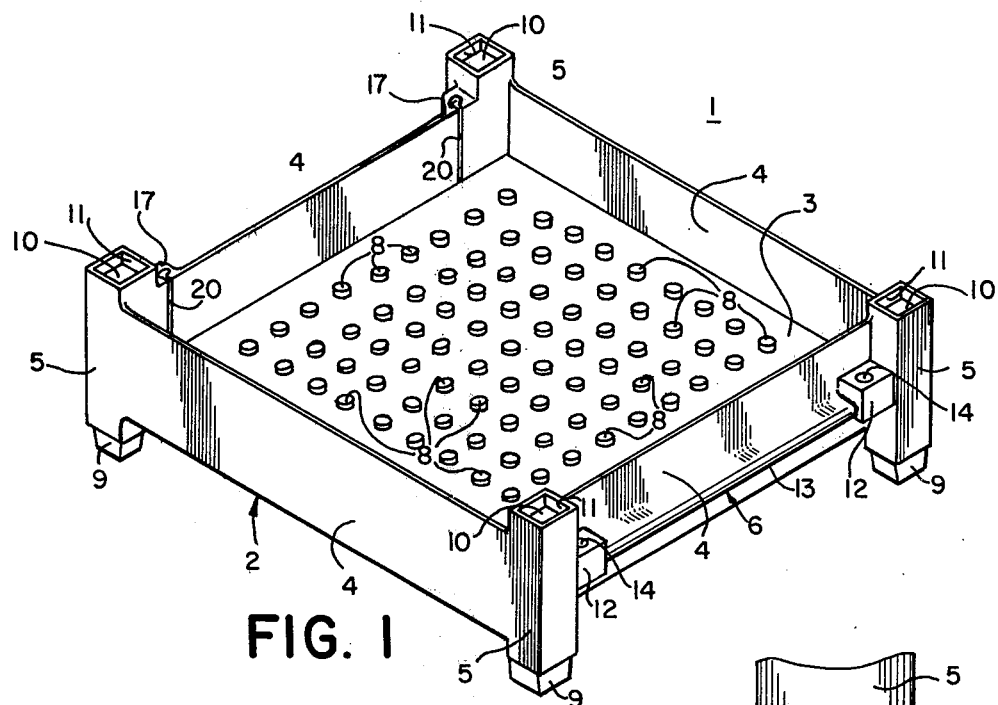
FIG. 1 is an isometric view of the formation tub of the present invention, also showing the fluid inlet.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
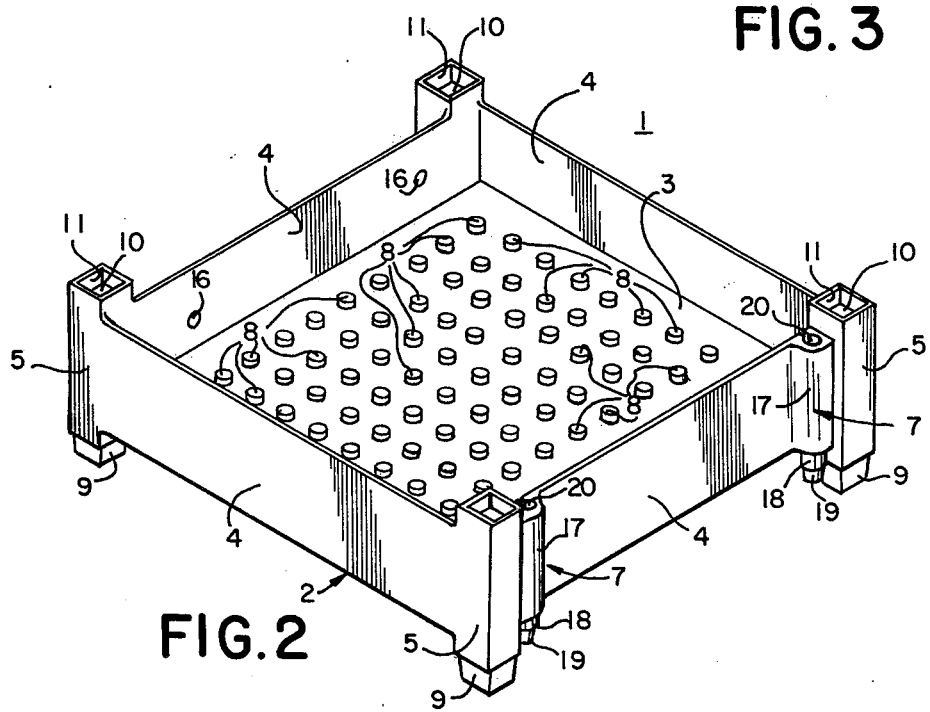
FIG. 2 is an isometric view of the formation tub of the present invention, also showing the fluid outlet, or drain.

Referring now to FIGS. 1 and 2, there is illustrated a preferred embodiment of the formation tub 1 of the present invention, comprising generally a central tub body 2, having a base 3 and sides 4, each corner of which is provided with a support means 5 such as the legs illustrated, and having along two of its sides 4 an inlet means 6 (shown in FIG. 1) and an outlet means 7 (shown in FIG. 2) adapted to direct a fluid to, through and out of tub body 2. Each of the elements above described combine to form a unitary formation tub 1 having no individual parts requiring assembly prior to use.

Tub body 2 is generally rectangular in shape. As illustrated, fluid inlet 6 and fluid outlet 7 are positioned along the major axis of the tub 2. This is preferred to maximize fluid flow, and to reduce dwell time within tub 2. Sides 4 extend upwardly from base 3 as shown; and in order to minimize dimensional requirements, it is preferred that sides 4 rise vertically from base 3. Base 3 is also provided with a series of stand offs 8 which are positioned to essentially cover the entire base 3. Stand-offs 8 are positioned in vertically staggered rows, in order to assist in battery placement within the tub body 2.

At each corner of the tub body 2 there is provided support means 5 such as the legs illustrated. Each leg 5 is formed as part of the tub body 2 to provide a unitary assembly. As shown, legs 5 extend above and below tub body 2. This space is provided to accommodate batteries placed in tub body 2 during use of the assembly 1, as well as to enable a lifting means, such as a fork lift truck, to insert its tines between respective tub bodies 2 to lift or move the formation tubs 1 into position.

Figure 3:
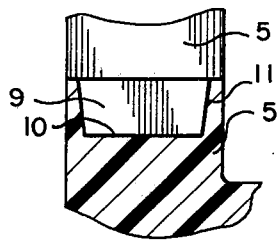
FIG. 3 is a partial, cross-sectional view of the supports used in conjunction with the formation tub illustrated in FIGS. 1 and 2.

As shown in FIG. 3, each leg 5 is provided with mating surfaces 9, 10 at each extremity. Lower mating surface 9 comprises an inverted, truncated pyramid shaped member which is tapered inwardly as it progresses downwardly. Upper mating surface 10 comprises a recess having side walls 11 configured to accept the lower mating surface 9 of another formation tub 1 stacked thereon. In this manner, assembly of a vertically arrayed system of formation tubs 1 is facilitated, as is alignment between the respective formation tubs 1 comprising the assembly.

Figure 4:
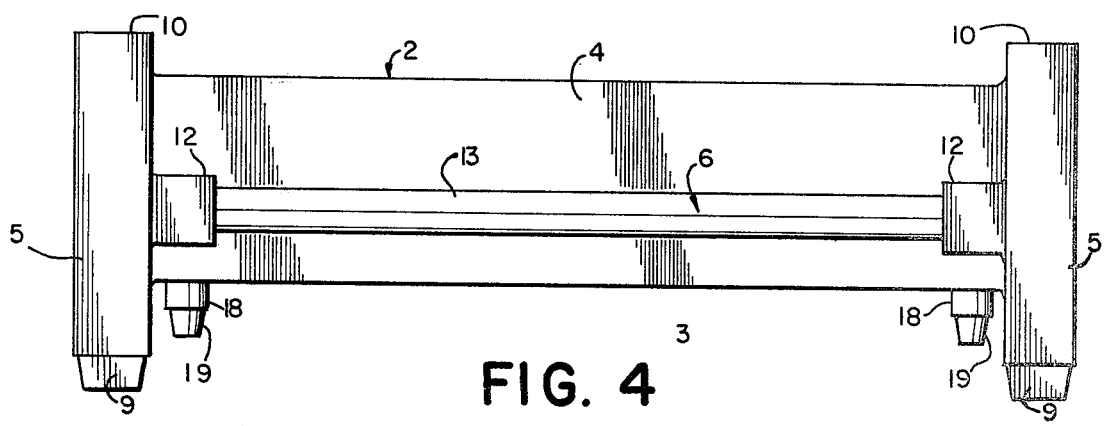
FIG. 4 is a side elevational view of the fluid inlet of the formation tub.
Figure 5:
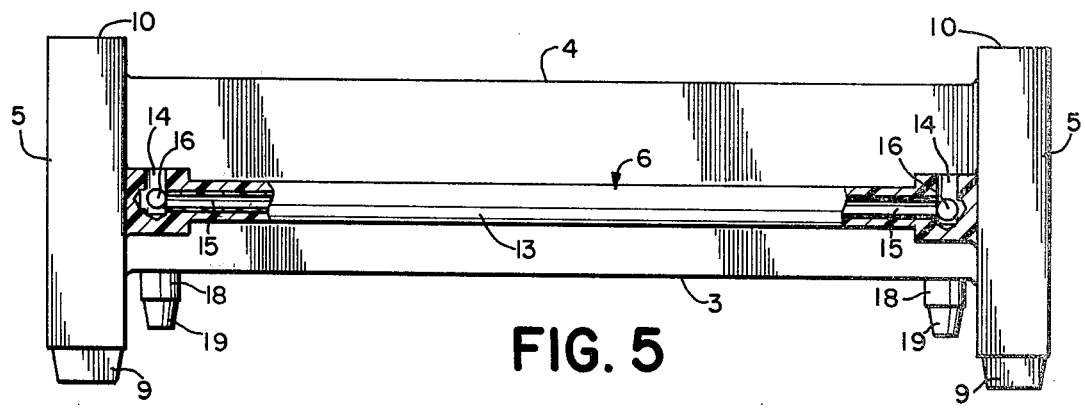
FIG. 5 is a cross-sectional view of the fluid inlet of the formation tub, taken along line 5—5 in FIG. 1.

As illustrated in FIG. 4, one wall 4 of formation tub 1 is provided with an inlet means 6. Inlet means 6 generally comprises two manifolds 12 between which is positioned a connecting tube 13. FIG. 5 illustrates the internal construction of inlet means 6. As shown, each manifold 12 comprises a first, vertical chamber at 14, and a second, horizontal chamber at 15. Chambers 14, 15 intersect at an orifice 16, which orifice 16 communicates with the interior of tub body 2. Connecting tube 13 is attached to and between the horizontal chamber 15 of each respective manifold 12, providing fluid communication between manifolds 12.

Figure 6:
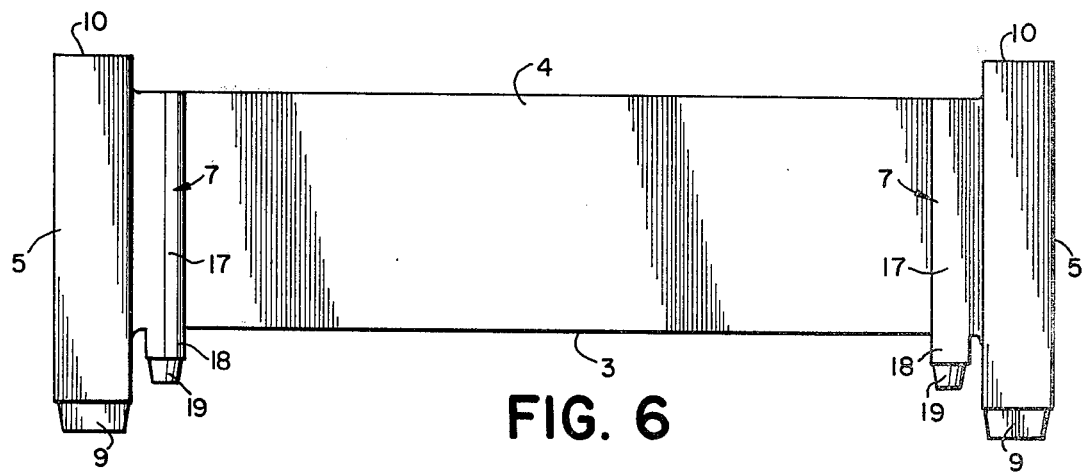
FIG. 6 is a side elevational view of the fluid outlet, or drain, of the formation tub.
Figure 7:
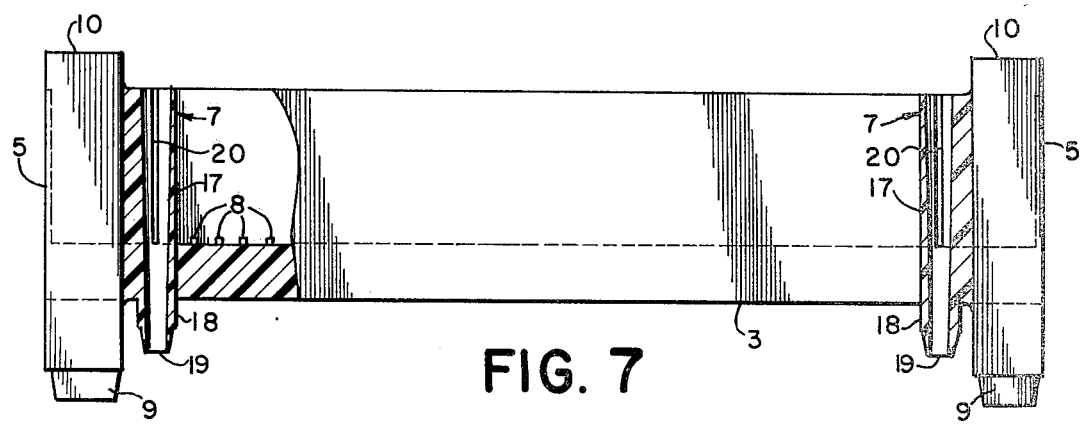
FIG. 7 is a cross-sectional view of the fluid outlet of the formation tub, taken along line 7—7 in FIG. 2.

Horizontally opposing the inlet means 6 is an outlet means 7, illustrated in FIG. 6. Outlet means 7 generally comprises vertically extending manifolds 17, each of which includes a depending outlet 18 which terminates in a tapered, truncated outlet nozzle 19. FIG. 7 illustrates the internal construction of outlet means 7. As shown, a vertically extending slot 20 is provided in wall 4 of tub body 2 to permit fluid communication between the interior of tub body 2 and the manifolds 17. Fluid exiting the interior of tub body 2 passes through the slots 20, into the fluid collecting cavity 28 of the manifolds 17. Fluid collecting cavity 28 tapers inwardly from top to bottom, directing the flow of fluid downwardly for discharge from the nozzle 19 of outlet 18.

As illustrated in the drawings, inlet means 6 and outlet means 7 are positioned to cooperate with each other, to permit formation tubs 1 to be stacked one on top of the other. For example, each orifice 16 is positioned in horizontal opposition to a corresponding drain slot 20. If only one orifice 16 and slot 20 were used, these structural elements would preferably be positioned in diagonal opposition. Moreover, the vertical chamber 14 of each manifold 12 is positioned so that it will be in vertical alignment with the nozzle 19 of the outlet means 7 of a vertically adjacent formation tub 1. In this manner, the formation tubs 1 are made to be interchangeable, enabling them to be stacked one on top of the other without requiring an alignment procedure.

Figure 8:
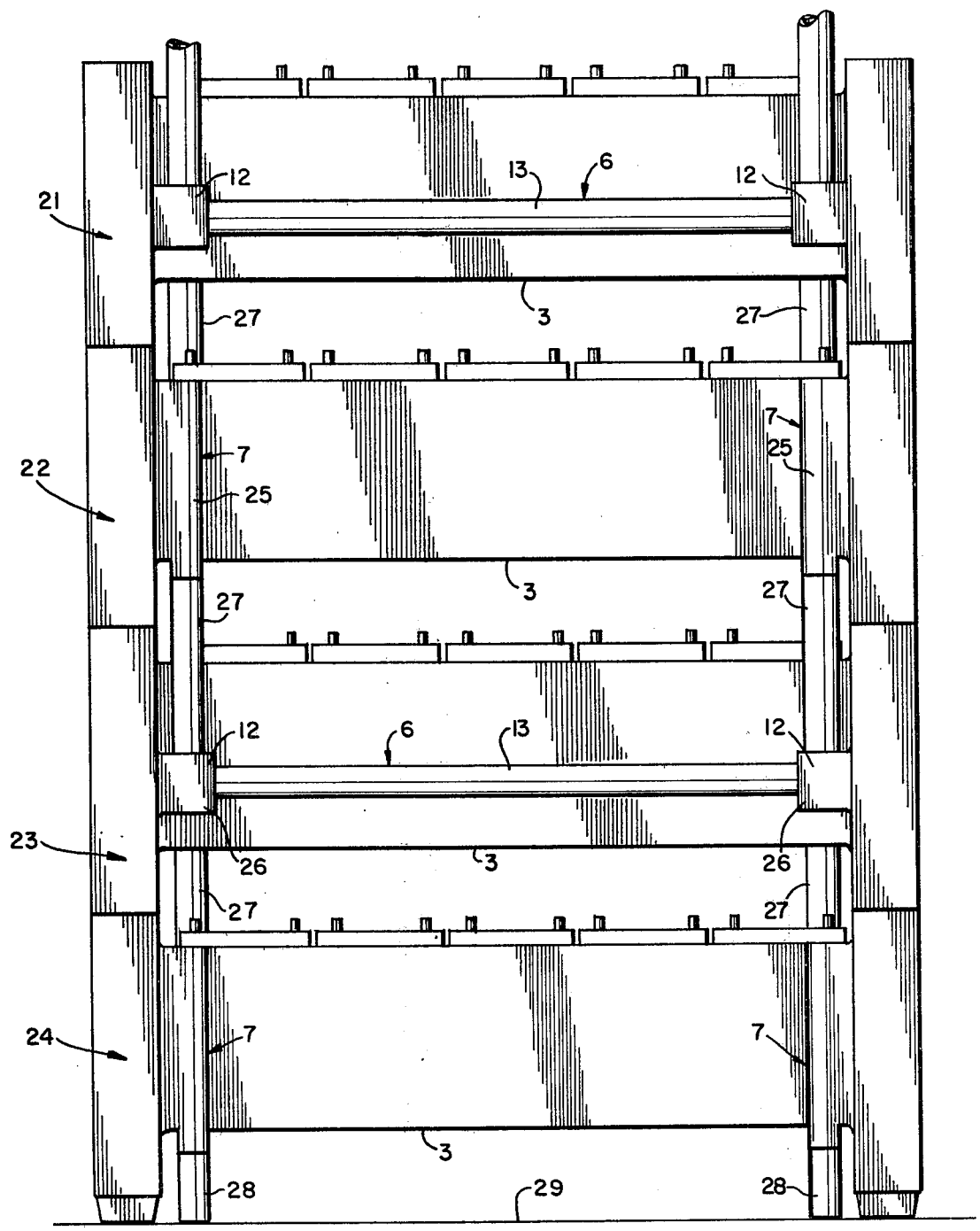
FIG. 8 is a side elevational view illustrating operation of the formation tub of the present invention in an assembled, vertically stacked array.

FIG. 8 illustrates how a group of formation tubs 1 of the present invention may be arranged in a vertical array, and how the resulting array may be used to form a plurality of storage batteries.

In the arrangement illustrated, four formation tubs 1 are shown stacked in series. Each formation tub comprises the tub body 2, legs 5, inlet means 6 and outlet means 7 previously described.

As shown, successive formation tubs 1 are advantageously stacked in an alternating arrangement, so that the outlet means of an upper formation tub is able to communicate with the inlet means 6 of the next lower tub. The structure of each formation tub, as previously described is particularly adapted for this purpose.

For example, the upper mating surface 10 of each leg 5 is adapted to engage the lower mating surface 9 of a leg 5 of another formation tub 1. By engaging the mating surfaces 9, 10 in this manner, alignment between vertically adjacent formation tubs 1 is automatically provided.

In addition, after vertically adjacent formation tubs 1 have been aligned in this manner, the inlet means 6 and outlet means 7 are also aligned for proper operation.

FIG. 8 illustrates four formation tubs 21, 22, 23, 24 which have been stacked in an alternating arrangement, one on top of the other. As a result of this alternating arrangement, the outlet means 7 of each formation tub is positioned over the inlet means 6 to the next lower formation tub. As previously described, the inlet means 6 and outlet means 7 of each formation tub are positioned in horizontal opposition so that each outlet means 7 is vertically aligned with the inlet means 6 to the next lower formation tub. Accordingly, fluid contained within the body 2 of, for example, formation tub 22 is able to exit that body, through outlet means 25, directly entering the inlet means 26 of formation tub 23. To assist in this fluid transfer, it is preferred to provide the connecting tubes 27 illustrated, between the outlet means of one formation tub, and the inlet means to the next lower formation tub, in order to assure proper fluid flow, and to reduce unnecessary leakage or splashing. In this manner, a series of formation tubs may be assembled in a vertical array.

In operation, a series of batteries to be formed would be positioned in juxtaposed, spaced relation to each other within the tub body 2 of each respective formation tub 21, 22, 23, and 24. Sufficient space should be provided between ajacent batteries to permit fluid contained within the tub to flow fully around the exterior of the battery case, to assure maximum heat transfer. As previously described, stand offs 8 are also provided in each formation tub to provide a space between the base 3 of each tub body 2 and the bottom of the batteries contained therein. After placement in the tub body 2, the terminals of the batteries are suitably connected in series, positive to negative, and in turn to the battery charging apparatus which will be used to form the batteries, as is customary in the battery art.

After filling each formation tub with the batteries, tubs 21, 22, 23, and 24 may then be stacked using a variety of existing handling equipment, such as a forklift truck. During stacking, all that need be done is to align the mating surfaces 9, 10 comprising each of the legs 5, and to place connecting tubes 27 between the inlet means and outlet means of vertically adjacent formation tubs. The system is then ready for operation.

During operation, a fluid, preferably water, is introduced into the inlet means 6 of a first formation tub 21, being drawn from a source (not shown). As shown, this fluid is advantageously introduced at both inlet manifolds 12, to provide a balanced water flow. Communicating tube 13 also assists in the uniform distribution of fluid received by inlet means 6, and consequently, the uniform introduction of the fluid, through each orifice 16, into the body 2 of formation tub 21. It is also possible, although less desirable, to introduce fluid into only one manifold 12, allowing communicating tube 13 to provide fluid to the orifice 16 associated with the other manifold 12.

In this manner, fluid is introduced into the body 2 of the first formation tub 21, which begins to fill, surrounding the batteries with fluid. As the tub body 2 of tub 21 is filled with fluid, some of the fluid will also exit tub body 2, through slots 20, flowing out of the formation tub 21 via outlet means 7. This fluid will then pass through connecting tubes 27 to the inlet means 6 of the next lower formation tub 22. This process will continue, eventually filling formation tubs 23, 24 in similar manner. The fluid level within each of the formation tubs 21, 22, 23, 24 is determined, primarily, by the rate at which fluid is introduced into the system as well as the width of the slot 20 associated with the outlet means 7.

Finally, the fluid will exit the outlet means 7 of the bottom formation tub 24, via the outlet nozzles shown at 28. This fluid is then allowed to pass onto, or through the floor 29 of the manufacturing facility to a cooling means (not shown). This cooling means generally includes a cooling tower for cooling fluid recovered from the series of formation tubs which has been heated during the formation of the batteries contained therein. The cooled water may advantageously be returned to the inlet means 6 of the first formation tub 21, if desired, providing a closed system. If a closed system is not required, the cooled fluid may simply be discharged as waste in an appropriate manner.

During the formation of a battery, gases are typically produced as a result of the electrochemical processes associated with the charging cycle. In the formation of large groups of batteries, this problem can become quite extensive, creating an undesirable environment in which to work. It has been found that this problem is reduced somewhat by stacking battery formation tubs in series, in the manner shown in FIG. 8. This is believed to be due to the condensation of gases which rise from the batteries during formation on the base 3 of the formation tub 1 placed over those batteries. The condensate is then drawn off from the system and delivered to the cooling means. For this reason, the cooling means is often advantageously provided with filtration means to remove these impurities from the cooling fluid prior to its reintroduction into the system or its discharge as waste.

Although FIG. 8 illustrates one way in which a series of unitary formation tubs 1 may be stacked in a series to create a cascading fluid-cooled system for use during battery formation, other systems are equally possible. For example, the number of tubs used may include more than the four tubs illustrated, or may include less than that number. Moreover, the circulation of fluid between vertically adjacent formation tubs 1 need not be accomplished as shown. For example, fluid may be simultaneously introduced into tubs 21, 23 while being drawn off at tubs 22, 24, forming two parallel fluid flow paths. It is even possible to separately introduce fluid into the system at the inlet means of each of the tubs 21, 22, 23, 24 and to separately withdraw fluid from the outlet means of each such tub. Many variations are possible.

In its preferred embodiment, the formation tub 1 is formed of a structural (PVC plastic) foam during manufacture. In this manner, the structure comprising the formation tub 1 is capable of being molded in place in a single operation, forming the tub body 2, the legs 5, the inlet means 6 and outlet means 7 as a unitary molded structure. The connecting tube 13 which extends between the manifolds 12 of the inlet means 6 may also be formed of a PVC plastic, and may be conveniently assembled as part of the unitary structure during the molding operation. Although it is preferred to mold the elements comprising the formation tub 1 as a single structure during manufacture, it is also possible to manufacture the formation tub 1 from a plurality of components which are assembled to form a unitary structure; however such an assembly procedure is less desirable. In such case, the elements comprising the assembled tub structure could be formed of a variety of materials if desired.

Manufacturing the formation tub 1 in this manner permits variation of the positioning of the inlet means and outlet means to accommodate a given manufacturing requirement if desired, providing a versatile yet easily assembled and operated formation tub assembly.

It will be understood that various changes in the details, material and arrangement of parts which have been herein described and illustrated in order to explain the nature of this invention may be made by those skilled in the art within the principle and scope of the invention as expressed in the following claims.

What is claimed is:

1. An apparatus for forming a plurality of batteries in a cooling fluid, the apparatus comprising:
   (a) a fluid containing body having a base and opposing side walls;
   (b) fluid inlet means positioned externally of a first side wall of the fluid containing body and including first manifold means associated with the first side wall and having an orifice which communicates with the fluid containing body; and
   (c) fluid outlet means positioned externally of a second side wall of the fluid containing body and including second manifold means associated with the second side wall and having an aperture which communicates with the fluid containing body;
   (d) wherein the fluid inlet means includes fluid input means and the fluid outlet means includes fluid drain means; and
   (e) wherein the fluid containing body is capable of being stacked with at least another fluid containing body to form a vertical array in which the fluid inlet means of a lower fluid containing body is aligned substantially directly beneath the fluid drain means of an upper fluid containing body.

2. The apparatus of claim 1 wherein the fluid containing body, the fluid inlet means and the fluid outlet means are molded in place to form a unitary structure.

3. An apparatus for forming a plurality of batteries in a cooling fluid, the apparatus comprising:
   (a) a fluid containing body having a base and opposing side walls;
   (b) support means positioned at spaced intervals along the fluid containing body;
   (c) fluid inlet means positioned along a first side wall of the fluid containing body and including first manifold means associated with the first side wall and having an orifice which communicates with the fluid containing body; and
   (d) fluid outlet means positioned along a second side wall of the fluid containing body and comprising a hollow, vertically extending member associated with the second wall of the fluid containing body, and an aperture providing fluid communication between the interior of the vertically extending member and the fluid containing body.

4. The apparatus of claim 3 wherein the support means comprise a first and a second terminating portion; the first terminating portion including a truncated, pyramid shaped protrusion; and the second terminating portion including a mating depression therein, adapted to engage the first terminating portion of another mating battery formation apparatus.

5. The apparatus of claim 3 wherein the fluid inlet means comprises at least two manifold members associated with the first wall of the fluid containing body, each including an orifice operatively associated therewith to provide fluid communication with the fluid containing body; and a tubular member connected between the two manifold members to provide fluid communication therebetween.

6. The apparatus of claim 3 wherein the aperture extends vertically for substantially the entire height of the second wall.

7. The apparatus of claim 3 wherein the orifice of the inlet means substantially horizontally opposes the aperture of the outlet means.

8. The apparatus of claim 3 wherein the inlet means has a fluid input means, the outlet means has fluid drain means, and wherein the input means is horizontally aligned with the drain means.

9. An apparatus for forming a plurality of batteries in a cooling fluid, the apparatus comprising a series of fluid handling assemblies having:
   (a) a fluid containing body having a base and opposing side walls;
   (b) support means connected to the side walls at corners defined by the intersection of adjacent side walls;
   (c) fluid inlet means positioned along a first side wall of the fluid containing body; and
   (d) fluid outlet means positioned along a second side wall of the fluid containing body horizontally opposing the first side wall;
   (e) wherein the fluid handling assemblies are stacked in series to form a vertical array, and wherein the fluid inlet means has at least one manifold which communicates with the fluid containing body and which includes fluid input means; wherein the fluid outlet means has at least one vertically extending member which communicates with the fluid containing body and which includes a fluid drain means; and wherein the fluid input means of a first fluid handling assembly is positioned so that it is vertically aligned beneath the fluid drain means of a second fluid handling assembly positioned over the first fluid handling assembly.

10. The apparatus of claim 9 wherein each of the fluid handling assemblies is unitary in structure.

11. An apparatus for forming a plurality of batteries in a cooling fluid, the apparatus comprising:
 (a) a fluid containing body having a base and opposing side walls;
 (b) support means positioned at spaced intervals along the fluid containing body;
 (c) fluid inlet means positioned along a first side wall of the fluid containing body and comprising at least two manifold members associated with the first wall of the fluid containing body; a tubular member connected between the two manifold members providing fluid communication therebetween; and an orifice operatively associated with each manifold member providing fluid communication with the fluid containing body; and
 (d) fluid outlet means positioned along a second side wall of the fluid containing body and comprising a hollow, vertically extending member associated with the second wall of the fluid containing body, and a vertically extending slot providing fluid communication between the vertically extending member and the fluid containing body;
 (e) wherein the body, the support means, the fluid inlet means, and the fluid outlet means form a unitary structure.

12. The apparatus of claim 1 wherein the base of the fluid containing body is substantially flat and rectangular.

13. The apparatus of claim 12 further comprising means for spacing the bottoms of the batteries from the base of the fluid containing body into which they are placed.

14. The apparatus of claim 12 wherein the support means are positioned at the corners of the body.

15. The apparatus of claim 1 wherein the first side wall and the second side wall horizontally oppose each other.

16. The apparatus of claim 1 wherein the support means comprise a first and a second terminating portion; the first terminating portion including a truncated, pyramid shaped protrusion; and the second terminating portion including a mating depression therein, adapted to engage the first terminating portion of another mating battery formation apparatus.

17. The apparatus of claim 11 wherein the slot extends vertically for substantially the entire height of the second side wall.

18. The apparatus of claim 11 wherein the orifice of the inlet means substantially horizontally opposes the slot of the outlet means.

19. The apparatus of claim 11 wherein the inlet means has a fluid input means, the outlet means has fluid drain means, and wherein the input means is horizontally aligned with the drain means.

* * * * *